United States Patent
Foote et al.

(10) Patent No.: US 7,873,979 B1
(45) Date of Patent: Jan. 18, 2011

(54) METHOD AND APPARATUS FOR JAVATV XLETS FOR ANALOG BROADCAST CHANNELS

(75) Inventors: William F. Foote, Los Angeles, CA (US); William J. Sheppard, Sunnyvale, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1799 days.

(21) Appl. No.: 11/010,694

(22) Filed: Dec. 10, 2004

(51) Int. Cl.
*H04N 7/173* (2006.01)
(52) U.S. Cl. .................................... 725/110; 725/109
(58) Field of Classification Search .......... 725/86–112, 725/61, 64, 65, 67, 68, 120, 121, 122, 152, 725/25, 28, 129, 47, 134, 136, 132, 131, 725/139, 151, 135, 142, 34, 62, 113, 58; 709/219, 228; 715/219
See application file for complete search history.

(56) References Cited

U.S. PATENT DOCUMENTS

| | | | | |
|---|---|---|---|---|
| 4,994,909 A * | 2/1991 | Graves et al. | ............. | 725/92 |
| 6,081,263 A * | 6/2000 | LeGall et al. | ............. | 715/760 |
| 6,286,051 B1 * | 9/2001 | Becker et al. | ............. | 709/236 |
| 6,473,404 B1 * | 10/2002 | Kaplan et al. | ............. | 370/238 |
| 6,483,547 B1 * | 11/2002 | Eyer | ............. | 348/473 |
| 7,145,898 B1 * | 12/2006 | Elliott | ............. | 370/352 |
| 7,266,832 B2 * | 9/2007 | Miller | ............. | 725/34 |
| 2001/0000826 A1 * | 5/2001 | Bellamy | ............. | 725/110 |
| 2003/0229900 A1 * | 12/2003 | Reisman | ............. | 725/87 |
| 2005/0155057 A1 * | 7/2005 | Wei | ............. | 725/38 |

OTHER PUBLICATIONS

Authors: Bart Calder, Jon Courtney, Bill Foote, Linda Kymitszke, David Rivas, Chihito Saito, James Van Loo, Tao Ye Java TV API Whitepaper, Version 1.0 (Nov. 14, 2000).*

* cited by examiner

*Primary Examiner*—Joseph P Hirl
*Assistant Examiner*—An Nguyen
(74) *Attorney, Agent, or Firm*—Park, Vaughan, Fleming & Dowler LLP

(57) ABSTRACT

One embodiment of the invention provides a method for receiving Java xlets including receiving an analog service identifier and utilizing the analog service identifier to perform a lookup into a lookup structure containing xlet addressing data. Xlet addressing data associated with the analog service identifier is returned and utilized to request an xlet.

23 Claims, 6 Drawing Sheets

46

| Analog Service Identifier 40 | URI 42 |
|---|---|
| Service 1 | URI 1 |
| Service 2 | URI 2 |
| Service 3 | URI 3 |

Figure 4

METHOD AND APPARATUS FOR JAVATV XLETS FOR ANALOG BROADCAST CHANNELS

TECHNICAL FIELD

The present invention relates to the general field of broadcast television services. More specifically the invention relates to a method and apparatus for receiving JavaTV xlets associated with an analog broadcast, as typically might apply over a cable television system.

BACKGROUND

JavaTV has had great standardization success in MHP and MHP-derived standards, such as OCAP and ACAP in the United States, and ARIB B.23 in Japan. In the United States, most commercial activity is around the CableLabs OCAP specification, which is tailored to digital cable television. In an OCAP network, Java applications (also referred to as xlets) may be associated with a television service (often referred to as a television channel). These associated Java applications may be referred to as "service-bound xlets". For example, a service-bound xlet may be a program specific application such as an application deployed with a game show that allows viewers to play along at home and an application that provides interactive information about a sporting event. Other sample categories of service-bound xlets include advertisement applications, delivery of customized information, and voting/polling applications.

For digital services, service bound xlets are transported and received using DSMCC object carousel signaling. DSMCC object carousels carry file systems using MPEG packets and are therefore usable only with digital television services. The system software residing on a set-top box identifies and authenticates the presence of the service bound xlets present in the digital television service. In OCAP, this can optionally be mediated by a monitor application provided by the Cable operator. The service bound xlets are launched to provide the desired xlet application.

On many cable networks in the United States, a large number of services are still broadcast as analog services. In addition, analog services continue to be broadcast over-the-air. Although analog services require greater bandwidth than digital services, analog services can be received on legacy analog cable television receivers, including analog cable-ready TV sets and videocassette recorders. As a result, many popular services such as ESPN, MTV, CBS, and NBC are often distributed as an analog service. These popular analog services are also delivered over current hybrid digital/analog cable systems. In one typical setup, analog/digital set-top boxes capable of interactive services using OCAP can only provide service-bound xlets for the digital services.

Since JavaTV xlets distributed using DSMCC object carousels cannot be received on analog services, there is therefore a need for improved methods and apparatuses for receiving service bound xlets for analog services.

SUMMARY OF THE INVENTION

The present invention provides a solution to the needs described above through an inventive method and apparatus for receiving xlets for associated analog services.

One embodiment of the invention provides a method for receiving Java xlets. The method includes receiving an analog service identifier at a receiver and utilizing the analog service identifier to perform a lookup into a lookup structure containing xlet addressing data. The xlet addressing data associated with the analog service identifier is returned from the lookup. The xlet addressing data is used to request an xlet from an xlet server, and the requested xlet is received from the xlet server.

One embodiment of the invention provides a method for receiving Java xlets including receiving an analog service from a service provider, where the encoded xlet addressing data is carried via the vertical blanking interval (VBI). The xlet addressing data is decoded and used to request an xlet from an xlet server.

Another embodiment of the invention provides a method for receiving Java xlets including receiving an analog service identifier and utilizing the analog service identifier to perform a lookup into a lookup structure containing xlet addressing data. Xlet addressing data associated with the analog service identifier is returned and utilized to request an xlet.

DESCRIPTION OF THE DRAWINGS

The features and advantages of the apparatus and method of the present invention will be apparent from the following description in which:

FIG. 4 illustrates an embodiment of a look-up table utilized by the invention.

DETAILED DESCRIPTION OF THE PREFERRED EMBODIMENTS

The present invention provides a solution to the needs described above through an inventive method and apparatus for receiving service bound xlets for analog services.

Other embodiments of the present invention will become apparent to those skilled in the art from the following detailed description, wherein is shown and described only the embodiments of the invention by way of illustration of the best modes contemplated for carrying out the invention. As will be realized, the invention is capable of modification in various obvious aspects, all without departing from the spirit and scope of the present invention. Accordingly, the drawings and detailed description are to be regarded as illustrative in nature and not restrictive.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Figure 1:
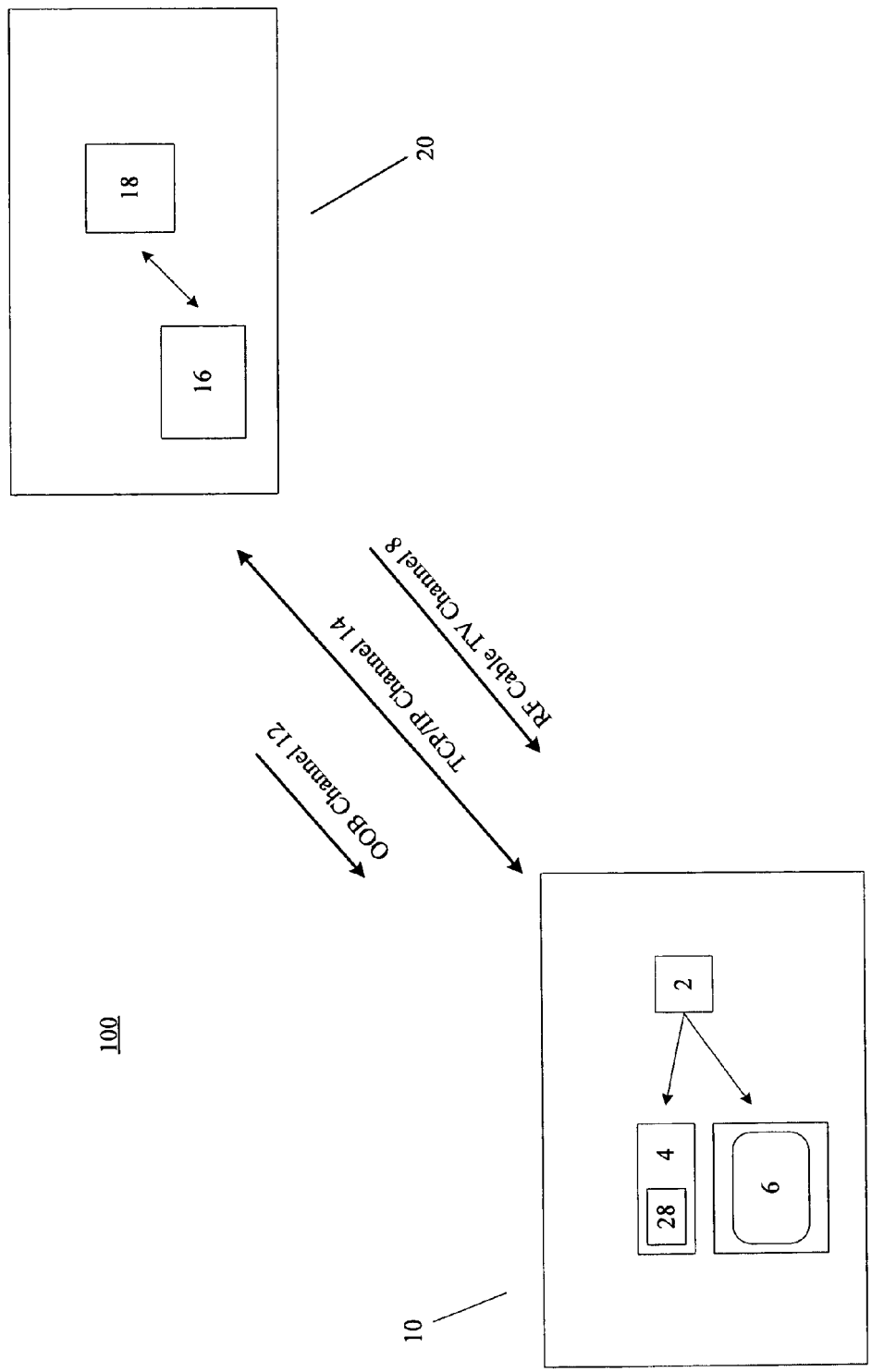
FIG. 1 illustrates an embodiment of a cable service network on which the present invention operates.

FIG. 1 illustrates a cable service network 100 on which an embodiment of the present invention operates. At a user end 10 is a user input device 2 such as a remote control which controls a set-top box (STB) 4 and a television (TV) 6. STB 4 includes a resident monitor application 28 with look-up functionality described in further detail below. At a master headend 20 resides a Multiple Service Operator (MSO) (the cable television broadcast system operator) 16 and xlet server 18. Xlet server 18 may be an addressable network device utilizing TCP/IP residing anywhere on the Internet. In an embodiment of the invention xlet server 18 is a web server utilizing HTTP or a file server utilizing FTP. Although an embodiment is discussed herein describing a set-top box, other suitable devices acting as clients and receivers may be utilized to receive television services and xlets and to execute xlets.

In an embodiment of the invention, cable service network 100 is a two-way hybrid-fiber coaxial (HFC) network capable of delivering both digital and analog services from MSO 16 to STB 4 at user end 10. The invention described herein may also be utilized with other types of cable networks delivering analog and digital services. In a further embodiment, analog services may be delivered over-the-air and received at user end 10 with a TV receiver antenna. Delivery of services and data communications between master headend 20 and user end 10 are performed using RF Cable TV channel 8, out-of-band (OOB) channel 12, and TCP/IP channel 14, which in an OCAP environment is a Data Over Cable Service Interface Specifications (DOCSIS) protocol transmission.

In an embodiment of the invention, the present invention utilizes a TCP/IP connection for delivery of xlets. The TCP/IP channel is established with a DOCSIS cable modem built into STB 4. In a further embodiment, an external device to STB 4 is utilized to transmit data using the DOCSIS protocol and coupled to STB 4 using an Ethernet interface. In a further embodiment, xlets are delivered using an OOB channel 12 instead of a TCP/IP connection. OOB channel 12 provides continuous communication between MSO 16 and STB 4. STB 4 gathers the desired associated xlets from an object carousel broadcast from MSO 16 on OOB channel 12. A personal computer may be used in place of STB 4.

Figure 2:
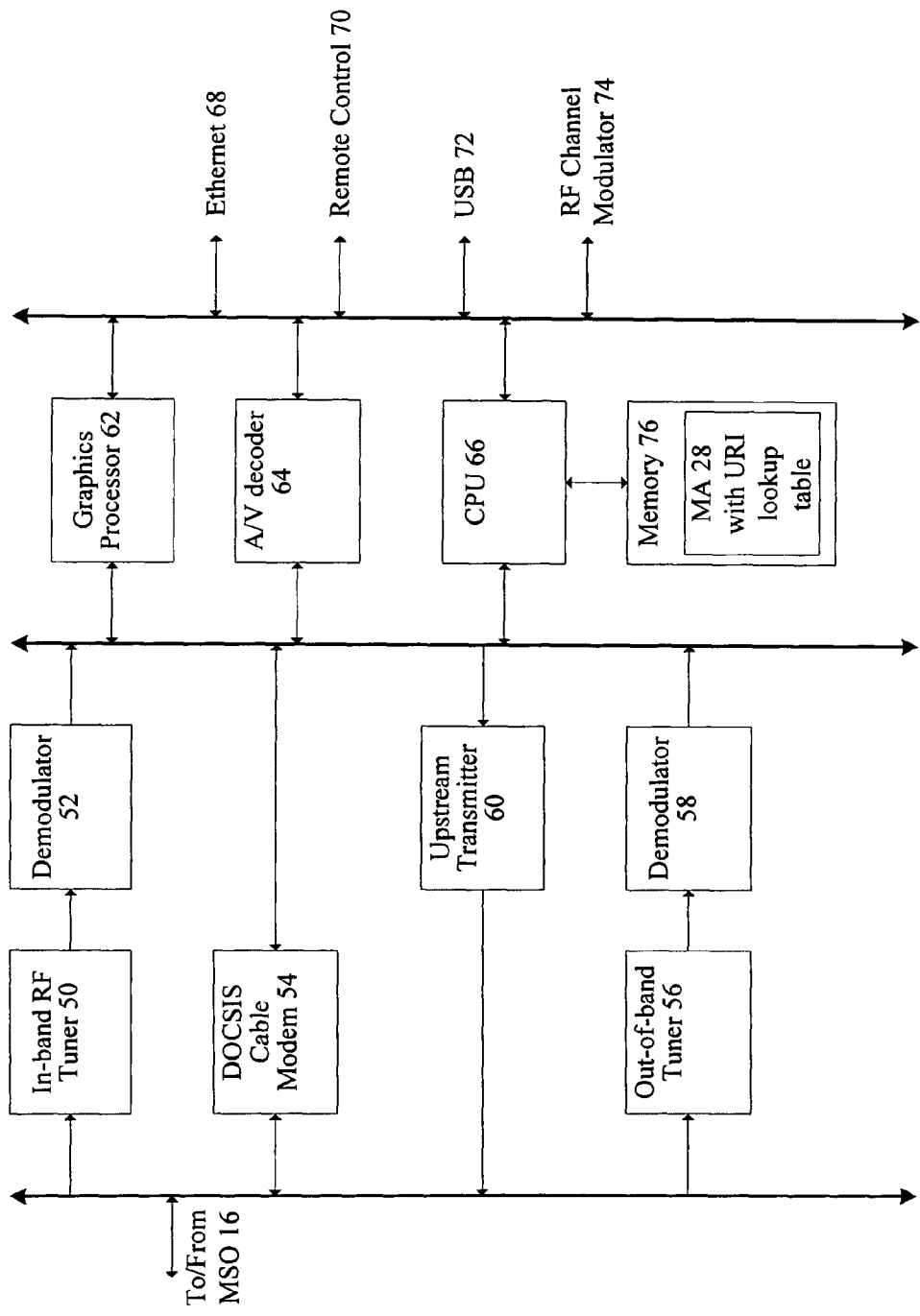
FIG. 2 is a simplified block diagram of a set-top box including hardware and software resources for receiving television services and applications

FIG. 2 is a simplified block diagram of a STB 4 including hardware and software resources for receiving television services and xlets in accordance with an embodiment of the present invention. STB 4 includes RF front-end components and demodulators such as in-band RF tuner 50, demodulator 52, out-of-band tuner 56, demodulator 58, and DOCSIS cable modem 54. DOCSIS cable modem 54 includes an RF QAM transceiver operating according to DOCSIS 1.0/1.1 protocols and transparently transmits and receives IP packets between user end 10 and master headend 20. STB 4 includes processing components such as central processing unit (CPU) 66, audio/video (A/V) decoder 64, graphics processor 62, and memory 76. STB 4 further includes user/output interfaces such as Ethernet 68, remote control 70, USB 72, and RF channel modulator 74. Upstream transmitter 60 is utilized to transmit data packets to MSO 16 from STB 4.

In-band RF tuner 50 receives the in-band downstream signals from MSO 16. In-band RF tuner 50 typically receives fixed frequency broadcast channels. The in-band downstream signal is demodulated by demodulator 52. The demodulated in-band downstream signal is then forwarded to A/V decoder 64 for decoding. From A/V decoder 64, the decoded signal is sent to graphics processor 62 and output to an output interface for display. Out-of-band tuner 56 receives the out-of-band downstream signal from MSO 16. The out-of-band downstream signal is demodulated by demodulator 58. Cable modem 54 initiates TCP/IP connections to receive and send IP data.

Central processing unit (CPU) 66 processes information and instructions used by STB 4 and interfaces with memory 76. Memory 76 is any type of random access memory that can be used to store code and data for CPU 66. Memory 76 includes monitor application software 28 with lookup tables utilized to obtain xlets associated with analog services.

Figure 3:
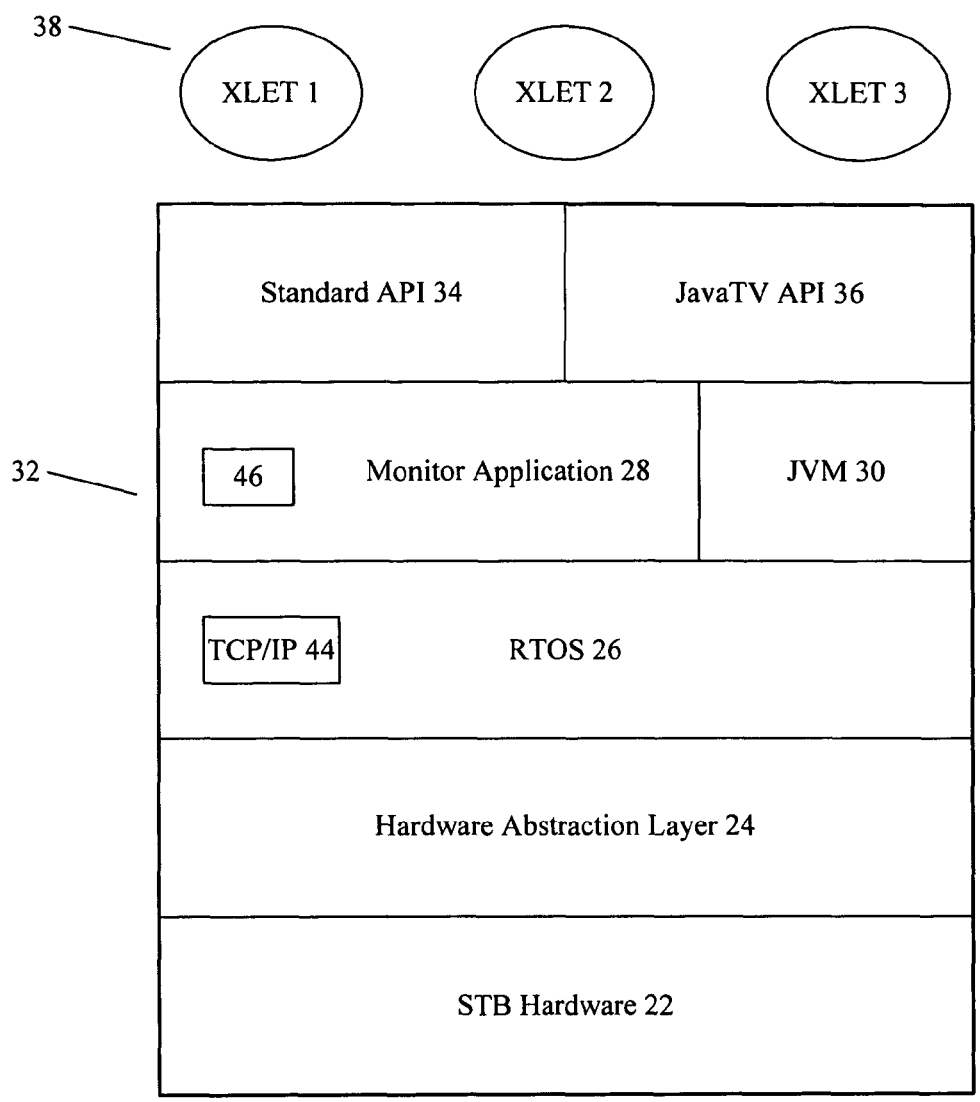
FIG. 3 illustrates an embodiment of the software architecture of an embodiment of the invention.

Referring to FIG. 3, the architecture of the software residing on STB 4 in an embodiment of the invention is illustrated. At the lowest level of the diagram shown in FIG. 3 is STB hardware 22 on which the software of the present invention is executed. Hardware 22 executes a real time operating system (RTOS) 26 which provides the basic functionality of the STB platform. A hardware abstraction layer 24 comprises software drivers to control the various devices in STB hardware 22. The particular RTOS 26 selected should be as independent as possible from the hardware devices. RTOS 26 functions in a real-time environment and can handle sophisticated tasks in a limited memory environment. Furthermore, STB hardware 22 may have multiple operating systems to enable the widest range of applications over the cable TV network. A few of the operating systems which may be utilized include Linux, Vx Works, and PowerTV. RTOS 26 supports Transport Control Protocol/Internet Protocol (TCP/IP) 44. Each STB 4 can therefore be addressable as a network device.

STB hardware 22 runs the Java virtual machine 30. The Java virtual machine 30 is a software application that executes in the environment of the native operating system and provides a common environment for applications written in the Java programming language. The Java virtual machine is responsible for portability of Java applications. The Java virtual machine 30 provides a layer of abstraction between the RTOS 26 and executable Java xlets, providing a Java-to-operating system interface so that xlets written in Java can be executed on a platform running an operating system which would not otherwise support execution of the program. Because Java virtual machines exist for many different platforms, the same Java xlets can be executed on each of these different platforms.

STB hardware 22 executes JavaTV 36 on the Java virtual machine 30. JavaTV 36 is an application environment specifically designed for interactive television services that run on digital broadcast receivers. JavaTV 36 includes a subset of core Java application programming interfaces (APIs) and a set of APIs which are directed specifically to features required by interactive television services. The JavaTV APIs provide a high-level, protocol-independent, common set of APIs for applications that are independent of underlying hardware platforms and broadcast network technology on which the applications are deployed. JavaTV implementations require a Java virtual machine, so the Java virtual machine 30 may therefore be considered part of JavaTV 36.

The JavaTV API characterizes television programs as services. This is an abstraction that provides a common way to refer to a wide variety of content that may appear in a broadcast environment. For example, a service can refer to a regular TV program with its synchronized audio and video or to an enhanced television broadcast that contains audio, video, and a Java application that is synchronized with the broadcast. The JavaTV API provides a means for selecting services, accessing a database containing service information, controlling a television-specific media player, and accessing data that is broadcast along with a television signal. Content developers can write many types of television-specific applications, or services, including electronic program guides, program-specific applications, stand-alone applications, and advertisements.

A service is a collection of content for presentation on a receiver. This collection is handled as a unit within the JavaTV API. Services can be selected for presentation. Television viewers often refer to this concept as a "television channel." A service may consist of multiple audio and video streams as well as data. Services have characteristic service information (SI), which is stored in the SI database. SI describes the layout and content of an audio/video/data stream, such as the MPEG-2 transport stream.

The Java TV API gives programs written in the Java programming language control of broadcast television receivers and set-top boxes. The JavaTV API provides application developers with the ability to easily build applications that are independent of the underlying broadcast network technology on which they will be deployed. For example, many applications need basic information from a service information database, such as a list of the names of services currently available. The Java TV API provides an abstraction that permits applications to obtain this information in a manner independent of the service information protocol currently in use. This allows an application to be written and then reused in a variety of network environments. The Java TV API is designed throughout with a high level of abstraction from hardware and over-wire protocols. Wherever possible, the Java TV API relies on an application environment to provide general purpose APIs. For example, file storage APIs and network communication APIs are provided by the application environment. In some cases, functionality that might be available on a set-top box is exposed with another Java extension.

The present invention utilizes a lookup table 46, which in an embodiment of the invention, indexes analog service identifiers to URIs. Lookup table 46 is described further in reference to FIG. 4 below. In an embodiment of the invention, the lookup table 46 is integrated into monitor application 28. Monitor application 28 is an unbound application designed to help manage execution of OCAP applications on an OCAP receiver. Monitor application 28 continuously runs and manages and controls the resources of STB 4, and resides on middleware layer 32.

The OCAP specification is the minimal profile specification for the next generation of middleware software for digital cable set-top boxes and other digital devices to be deployed by cable operators in North America. OpenCable Application Platform 1.0 (OCAP 1.0) was developed by CableLabs with numerous cable operating companies and software firms. OCAP 1.0 is based on the DVB Multimedia Home Platform 1.0.2 (DVB MHP).

According to the OCAP specification, the MSO is responsible for the development, maintenance and delivery of the monitor application. The OCAP specification defines a set of privileged APIs which can be used by monitor applications. The MSO defines the specific role of the monitor application 28 based on functionality described by the OCAP specification. In an embodiment of the invention, monitor application 28 is automatically downloaded to STB 4 from MSO 16 during boot-up of STB 4. Once downloaded, monitor application 28 registers and runs on STB 4.

In accordance with the OCAP specification, monitor application 28 may perform such functions as filtering user input events, application filtering, registering unbound applications in the application database, system reboots, and display of closed captioning. In particular, monitor application 28 may monitor the services selected by a user. Residing above standard API 34 and JavaTV API 36 are downloaded executable xlets 38 that have been requested by monitor application 28 in response to a user analog service selection.

Referring to FIG. 4, an embodiment of lookup table 46 utilized by the invention is illustrated. Lookup table 46 includes an analog service identifier column 40 and a URI column 42. The analog service identifier corresponds to the analog service selected for viewing by the user. Each entry in the analog service identifier column 40 includes a corresponding entry in the URI column 42 that identifies an associated xlet residing on a server 18 to be launched when a given analog service is selected. Although an embodiment utilizing a URI is described, other xlet addressing data may be used in lookup table 42.

In an embodiment of the invention, lookup table 46 and its contents are established by MSO 16 and are incorporated into monitor application. In further embodiments of the invention, an application other than the monitor application is utilized to perform lookups and request xlets using lookup table 46. For example, a continuously running application may be built into the firmware of the STB 4 residing below the monitor application to perform the processes described in reference to FIG. 5 below.

In an embodiment of the invention, xlets and related resources are packaged in a Java Archive file (JAR) format. The JAR file format was first introduced in version 1.1 of the Java Development Kit, and more recent versions include enhancements to JAR file functionality. URI addresses located in URI column 42 correspond to a JAR file to be downloaded. Monitor application 28 utilizes the corresponding URI in URI column 42 in lookup table 46 to request and obtain the JAR file associated with the selected analog service. In a further embodiment of the invention, a URI in a file system other than the Internet may be utilized. Each JAR file contains a manifest entry defining the initial xlet class of the xlet to invoke as the entry point when executing the xlet.

In an embodiment of the invention, URI addresses in URI column 42 utilize Hypertext Transfer Protocol (HTTP) to fetch the xlet file. In a further embodiment of the invention, URI addresses in URI column 43 utilize File Transfer Protocol (FTP) to fetch the xlet file. Although embodiments have been discussed herein describing HTTP and FTP, the lookup table 46 may utilize other protocols to fetch desired xlets over TCP/IP channel 14.

Figure 5:
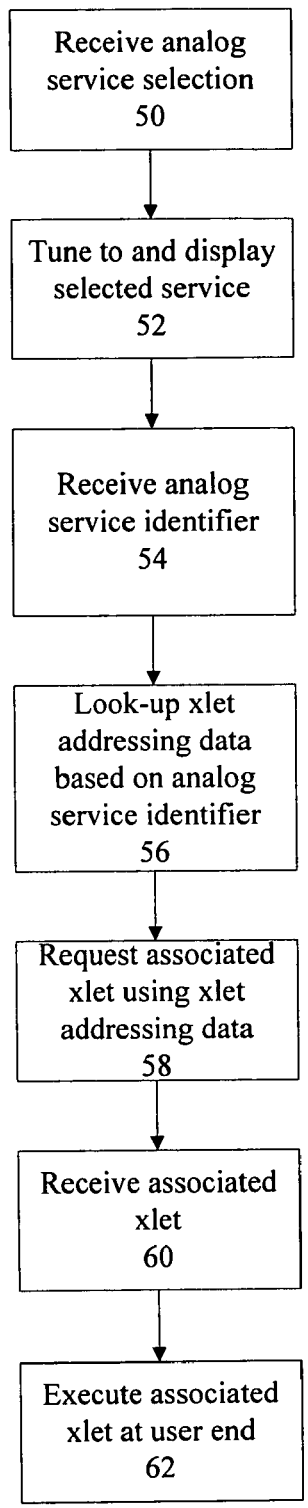
FIG. 5 is a flowchart illustrating the operation of the invention in an embodiment of the invention.

Referring to FIG. 5, a flowchart illustrating the operation of the invention in an embodiment of the invention is shown. A television viewer at user end 10 initiates an analog service selection by sending a channel selection command to STB 4 using user input device 2. At step 50, STB 4 receives the analog service selection. At step 52, STB 4 tunes to the selected analog service which has been broadcast over RF Cable TV channel 8 and displays the selected service on television 6.

At step 54, monitor application 28 receives an analog service identifier corresponding to the selected service name for processing. At step 56, monitor application 28 initiates a lookup of xlet addressing data based on the received analog service identifier. In an embodiment of the invention, the xlet addressing data is a URI. At step 58, monitor application 28 requests an associated xlet from xlet server 18.

In an embodiment of the invention, monitor application 28 opens a TCP/IP connection transmits the associated URI to initiate download of one or more associated xlets to STB from xlet server 18 utilizing DOCSIS protocol over TCP/IP channel 14. Monitor application 28 sends the HTTP URI request to xlet server 18 to fetch the desired xlet resource. Server 18 receives the HTTP request message, accesses the xlet resource specified in the message, and sends the resource to monitor application 28. In a further embodiment of the invention, STB 4 requests download of xlets utilizing OOB channel 12.

At step 60, the requested xlet is received at STB 4. At step 62, the downloaded xlet is executed on STB 4 by monitor application 28. If the television view changes the analog service selection, monitor application 28 terminates execution of the xlet and repeats the processes set forth in FIG. 5 with respect to the new analog service selection.

Figure 6:
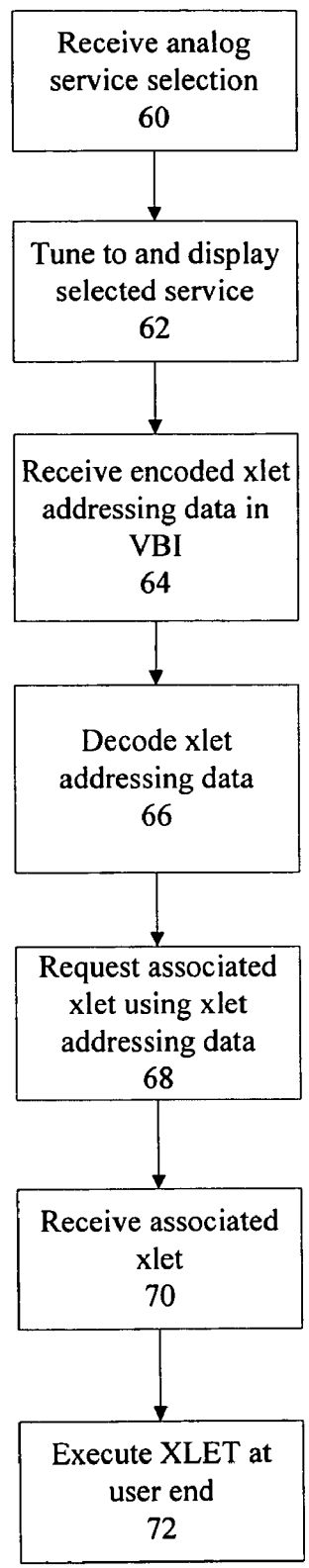
FIG. 6 is a flowchart illustrating the operation of the invention in a further embodiment.

FIG. 6 is a flowchart illustrating the operation of the invention in a further embodiment. A television viewer at user end 10 initiates an analog service selection by sending a channel selection command to STB 4 using user input device 2. At step 60, STB 4 receives the analog service selection. At step 62, STB 4 tunes to the selected analog service which has been broadcast over RF Cable TV channel 8 and displays the selected service on television 6. Simultaneously, at step 64, STB 4 receives encoded xlet addressing data in the vertical blanking interval (VBI) for processing by a VBI data retriever at STB 4. At step 66, STB 4 decodes the xlet addressing data. In an embodiment of the invention, xlet addressing data is a URI. At step 68, monitor application 28 requests an associated xlet from xlet server 18 using the decoded xlet addressing data. In an embodiment of the invention, monitor application 28 examines the analog service VBI for an encoded URI and decodes the encoded URI.

The encoded URI points to an associated xlet to be launched when a given analog service is selected. In an embodiment of the invention, xlets and related resources are packaged in a JAR format. The URI address corresponds to a JAR file to be downloaded. Each JAR file contains a manifest entry defining the initial xlet class of the xlet to invoke as the entry point when executing the xlet. In an embodiment of the invention, STB 4 initiates download from the decoded URI one or more associated xlets to STB over TCP/IP channel 14. In a further embodiment of the invention, STB 4 initiates download of xlets utilizing OOB channel 12. At step 70, the requested xlet is received at STB 4. At step 72, the downloaded xlet is executed on STB 4.

Thus, the invention provides improved methods and apparatuses design for receiving service bound xlets for analog services. Although an embodiment has been discussed herein describing using a lookup table, other data structures may be utilized to provide fast correlation between a selected analog service and an associated xlet addressing data. Although reference is made to use of a set-top box throughout the specification, one of ordinary skill in the art will recognize that other architectures could be used within the scope of the invention. For example, any receiver or comparable device having hardware and software similar to the set-top box necessary to perform the functions described herein may be used. Furthermore, a network computer containing such hardware and software may be utilized in place of a television and set-top box.

Having described the invention in terms of a preferred embodiment, it will be recognized by those skilled in the art that various types of components may be substituted for the configuration described above to achieve an equivalent result. It will be apparent to those skilled in the art that modifications and variations of the described embodiments are possible, and that other elements or methods may be used to perform equivalent functions, all of which fall within the true spirit and scope of the invention as measured by the following claims.

The invention claimed is:

1. A method for receiving Java xlets comprising:
   receiving an analog service identifier at a receiver;
   utilizing the analog service identifier to perform a lookup into a lookup structure containing addressing data for an xlet application;
   returning xlet addressing data associated with the analog service identifier;
   utilizing the xlet addressing data to request an xlet from an xlet server; and
   receiving the requested xlet from the xlet server.

2. The method of claim 1, wherein the receiver is a set-top box.

3. The method of claim 2, wherein the set-top box comprises a monitor application for performing lookups into a lookup structure.

4. The method of claim 1, wherein the lookup structure is a lookup table.

5. The method of claim 1, wherein the xlet is received utilizing the Data Over Cable Service Interface Specification protocol.

6. The method of claim 1, wherein the xlet is received over an out of band channel.

7. The method of claim 1, wherein the xlet is received over a TCP/IP channel.

8. The method of claim 1 further comprising executing the xlet at the receiver to provide services associated with the analog service identifier.

9. The method of claim 1, further comprising executing the requested xlet at the receiver in a JavaTV environment.

10. The method of claim 1, wherein the xlet addressing data is a URI.

11. The method of claim 1, wherein utilizing the xlet addressing data to request an xlet comprises initiating a HTTP request.

12. The method of claim 1, wherein the xlet server is a web server.

13. The method of claim 1, wherein the requested xlet is packaged in a Java archive file format.

14. A method for receiving Java xlets comprising:
   receiving an analog service identifier from a service provider comprising encoded addressing data for an xlet application associated with the analog service identifier carried by a vertical blanking interval;
   decoding the xlet addressing data;
   utilizing the xlet addressing data to request an xlet from an xlet server; and
   receiving the requested xlet from the xlet server.

15. The method of claim 14, further comprising executing the requested xlet at a receiver in a JavaTV environment.

16. The method of claim 14, wherein the xlet is received over a TCP/IP channel.

17. The method of claim 14, wherein the xlet addressing data is a URI.

18. The method of claim 14, wherein the requested xlet is packaged in a Java archive file format.

19. A non-transitory computer readable storage medium storing instructions that when executed by a computer cause the computer to perform a method for receiving Java xlets, comprising:
   receiving an analog service identifier at a receiver;
   utilizing the analog service identifier to perform a lookup into a lookup structure containing addressing data for an xlet application;
   returning xlet addressing data associated with the analog service identifier;
   utilizing the xlet addressing data to request an xlet from an xlet server; and
   receiving the requested xlet from the xlet server.

20. The computer-readable storage medium of claim 19, wherein the xlet is received over an out of band channel.

21. The computer-readable storage medium of claim 19, wherein the xlet is received over a TCP/IP channel.

22. The computer-readable storage medium of claim 19, wherein the xlet addressing data is a URI.

23. The computer-readable storage medium of claim 19, wherein utilizing the xlet addressing data to request an xlet comprises initiating a HTTP request.

* * * * *